United States Patent [19]

Kiyota et al.

[11] Patent Number: 4,520,624
[45] Date of Patent: Jun. 4, 1985

[54] DIESEL PARTICULATE FILTER SYSTEM

[75] Inventors: Yuhiko Kiyota; Katsuyuki Tsuji; Satoru Kume, all of Kyoto; Hiroaki Takada; Kiyoichi Shinsei, both of Hyogo; Akio Matsumoto; Hitoshi Ogawa, both of Hyogo, all of Japan

[73] Assignees: Mitsubishi Jiboshia Kogyo Kabushiki Kaisha; Mitsubishi Denki Kabushiki Kaisha, both of Japan

[21] Appl. No.: 630,054

[22] Filed: Jul. 12, 1984

[30] Foreign Application Priority Data

Jul. 15, 1983 [JP] Japan ................. 58-128779

[51] Int. Cl.$^3$ ............................. F01N 3/02
[52] U.S. Cl. ........................ 60/286; 55/283; 55/DIG. 30; 60/303; 60/311
[58] Field of Search ............ 60/286, 303, 311, 726, 60/737, 290, 289; 55/283, DIG. 30; 431/252

[56] References Cited

U.S. PATENT DOCUMENTS 3,688,497  9/1972  Bracken ................. 60/726
3,837,814  9/1974  Tanasawa ............... 60/303
4,450,682  5/1984  Sato ...................... 60/303

Primary Examiner—Douglas Hart
Attorney, Agent, or Firm—Sughrue, Mion, Zinn, Macpeak and Seas

[57] ABSTRACT

A diesel particulate filter system for treating the exhaust gas of a diesel engine which is small in size and inexpensive. The system includes a particulate filter connected in a gas line from the engine, a burner, including an ignition plug, connected at a point upstream of the particulate filter and which is supplied with fuel, a primary air flow for atomizing the fuel, and a secondary air flow for burning the particulates trapped in the particular filter and which supplies the particulate filter with a hot burning gas produced by the ignition plug. Primary and secondary pumps supply, respectively, the primary and secondary air flows. A single motor drives both the primary and secondary air pumps. The ignition plug and motor are controlled so that when the amount of particulates trapped in the filter exceeds a preset level, the ignition plug and motor are activated to clean the filter by burning the particulates in the burner.

10 Claims, 9 Drawing Figures

DIESEL PARTICULATE FILTER SYSTEM

BACKGROUND OF THE INVENTION

The present invention relates to a diesel particulate filter system used for treatment of exhaust gas from diesel engines. More particularly, the invention relates to an improvement of an air pump system used for feeding air into a burner to burn particulate matter contained in the exhaust of a diesel engine (hereinafter referred to as diesel particulates) trapped in the filter.

Diesel particulates are fine particles primarily composed of hydrocarbons. At high engine speeds, the exhaust gas has a sufficiently high temperature to burn the diesel particulates. However, at low engine speeds, the diesel particulates are discharged into the atmosphere unburnt. In order to prevent air pollution by diesel particulates, a ceramic filter or glass wool filter that traps diesel particulates is provided in the exhaust line. The filter, however, tends to become clogged as a result of prolonged use and requires occasional cleaning, which typically consists of blowing a hot gas onto the filter so as to burn the trapped diesel particulates. For details of an appropriate cleaning technique, reference can be made to Japanese Patent Applications (OPI) Nos. 12029/79 and 131518/80.

A recent achievement in diesel particulate burning systems is a technique for burning diesel particulates with the heat of a flame produced by feeding a fuel, primary air and secondary air, into a burner provided upstream of the diesel particulate filter. Being used for atomizing the fuel, the primary air requires a high pressure but not a high flow rate. On the other hand, the secondary air is used to burn the atomized fuel requires a fairly high flow rate, although it may have a low pressure. In order to meet these requirements, air is conventionally fed to the burner by two moving vane type air pumps of different discharge capacities.

SUMMARY OF THE INVENTION

The primary object of the present invention is to provide a small and inexpensive air pump system suitable for use in a diesel particulate filter system. The air pump system according to the present invention comprises an integral combination of two air pump units having different discharge capacities that are driven by a single motor.

BRIEF DESCRIPTION OF THE DRAWINGS

The present invention will hereunder be described in detail with reference to the accompanying drawings in which.

DESCRIPTION OF THE PREFERRED EMBODIMENTS

Figure 1:
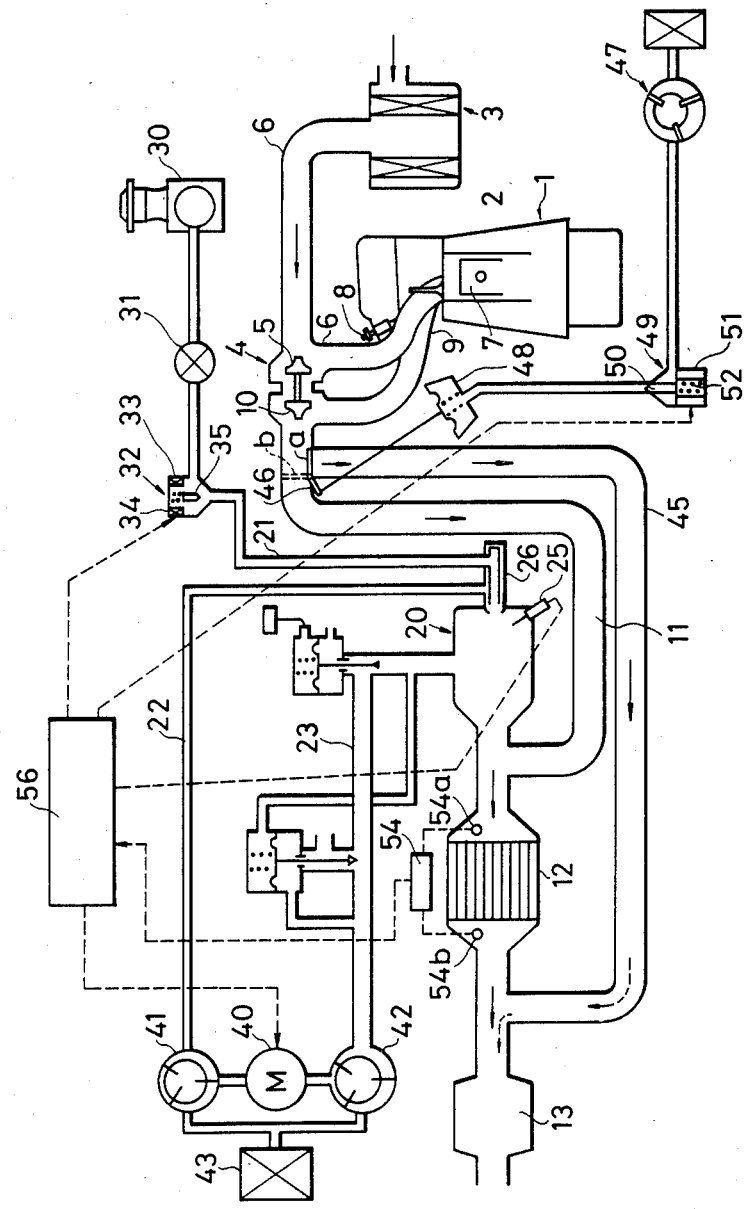
FIG. 1 is a schematic diagram of a diesel particulate filter system used in combination with the air pump system of the present invention.

FIG. 1 shows a general view of a diesel particulate filter system used in combination with the air pump system of the present invention. An engine 1 has a cylinder 2 which is fed with clean air from an air cleaner 3 after it has been pressurized by a compressor 5 in a turbocharger 4. Being fed through an intake pipe 6, the air in the cylinder 2 is compressed by a piston 7 of the engine as the piston 7 ascends, whereupon the temperature of the air is increased. Fuel is jetted through a nozzle 8, and the air-fuel mixture expands explosively, pushing the piston 7 downward. In the next upstroke of the piston, a valve in an exhaust pipe 9 opens to discharge the exhaust gas through that pipe. The discharged gas rotates a turbine 10 in the turbocharger 4 to drive the coaxial compressor 5, thereby supercharging clean air from the cleaner 3 into the intake pipe 6. The discharged gas through the turbine 10 flows through an exhaust line 11, purified by passage through a diesel particulate filter 12, and finally released into the atmosphere through a muffler 13.

Figure 2:
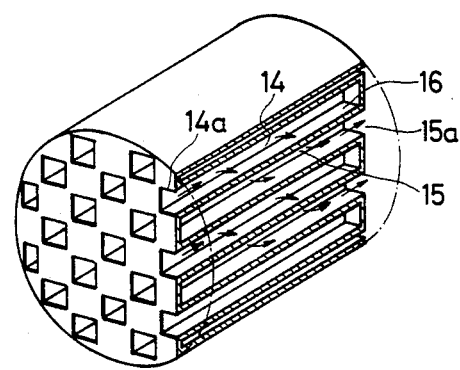
FIG. 2 is a perspective view of a preferred embodiment of a diesel particulate filter according to the present invention.

As shown in FIG. 2, the diesel particulate filter 12 (hereunder abbreviated to DPF) has a honeycomb structure in cross section and comprises columnar cells extending parallel to the longitudinal axis of the filter. Each cell is of the plug type wherein one end in the axial direction is open and the other end is closed. The cells are so arranged that at one end of the DPF 12 in the axial direction, the open end of one cell alternates with the closed end of an adjacent cell. As shown by arrows in FIG. 2, the exhaust gas enters the DPF 12 at the open end 14a of each cell 14, penetrates the wall 16 between adjacent cells 14 and 15, and leaves the filter at the open end 15a of the cell 15. With this process, the particulates are filtered out by passage through the walls of the individual cell.

As shown in FIG. 1, the system of the present invention employs a burner 20 disposed at a point upstream of the DPF 12. Connected in a branch from the exhaust line 11, the burner has the function of burning the diesel particulates trapped in the DPF 12. In order to achieve this function, the burner is supplied with fuel, primary air and secondary air, supplied respectively, through a fuel supply pipe 21, primary air line 22 and secondary air line 23.

Figure 3:
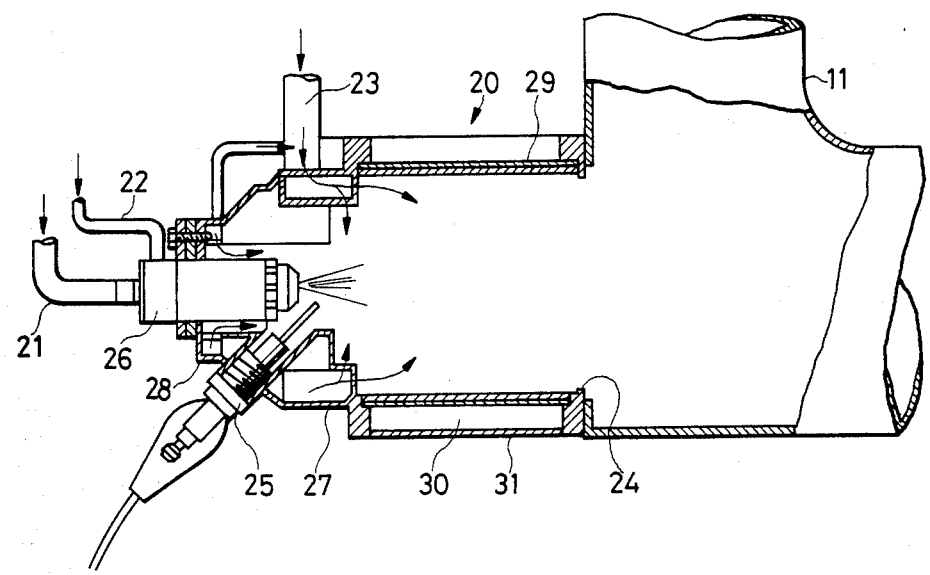
FIG. 3 is a longitudinal section showing an embodiment of a burner constructed according to the present invention.

As shown in detail in FIG. 3, the burner 20 is connected to the exhaust line 11 at an opening 24 located upstream of the DPF 12. The burner includes an ignition plug 25, a nozzle 26, secondary air supply chambers 27 and 28, a burner heat insulator 30 surrounding a combustion cylinder 29, and a casing 31. When fuel is fed into the nozzle 26 through the fuel supply pipe 21, the primary air flowing through the line 22 is throttled by the nozzle 26 and injected under pressure against the fuel so as to atomize it. The atomized fuel is ignited by the plug 25 to produce a flame, and at the same time, the secondary air from two partitioned chambers 27 and 28 is directed onto the flame. As a result, the temperature of the exhaust gas is elevated to a sufficiently high level to burn the particulates trapped in the DPF 12.

The fuel supplied to the burner 20 is of the same type as that supplied to he cylinder 2. It is fed to the nozzle 26 through a fuel pressure regulator 31 (FIG. 1) and a solenoid valve 32 by a separately provided fuel injection pump 30. The solenoid valve 32 is composed of a plunger 35, a coil 33 and a spring 34. When the coil is energized, the plunger 35 is attracted toward the coil 33 to open the solenoid valve 32. The nozzle 26 is also fed with a small air flow at a high discharge pressure that has been forced through the primary air supply line 22 by a primary air supply vane pump 41 driven by a DC motor 40. This primary air flow causes the fuel from the nozzle 26 to be atomized inside the burner 20. The burner 20 is also fed with a large air flow at a low discharge pressure that has been forced through the secondary air supply line 23 from a secondary air supply vane pump 42 which is also driven by the DC motor 40. As a result of the flow of the secondary air, the atomized air/fuel mixture in the burner 20 is ignited by the ignition plug 25, and the resulting hot gas cleans the DPF 12 by burning the diesel particulates trapped therein.

Reference numeral 43 in FIG. 1 designates an air cleaner. The primary and secondary air pumps 41 and 42 are not limited to those of the vane type as equally good results can be obtained by positive displacement air pumps such as ROOTS (trademark) air pumps or screw-type air pumps.

As shown in FIG. 1, the exhaust line 11 is provided with a bypass 45 that is connected to the line 11 at two points, one upstream and the other downstream of the line. A valve switch 46 is positioned at the upstream junction between the exhaust line 11 and the bypass 45. The valve switch 46 is driven by a link mechanism connected to a diaphragm 48 which further communicates with a vacuum pump 47. A solenoid valve 49 is provided between the diaphragm 48 and the vacuum pump 47. The solenoid valve 49 is composed of a plunger 50, a coil 51 and a spring 52. When the coil 51 is energized, the plunger 50 is attracted toward the coil 51, thereby opening the valve 49. Then, the negative pressure in the vacuum pump 47 acts on the diaphragm 48 and the valve switch changes its position from a to b so as to close the exhaust line 11. As a result, the exhaust gas from the cylinder 2 in the engine 1 is passed to the muffler 13 through the bypass 45. In this case, the exhaust gas from the engine 1 has no effect on the combustion in the burner 20.

The system shown in FIG. 1 also includes a detector 54 for detecting the amount of diesel particulate trapped in the filter 12. This detector includes pressure sensors 54a and 54b located within the exhaust line 11. When the difference in pressure between the two ends of the DPF 12 exceeds a preset level, the detector 54 sends a signal indicating this fact to a control unit 56 to effect cleaning of the filter. Upon receiving such a signal from the detector 54, the control unit 56 energizes the coil 51 of the solenoid valve 49 so that the exhaust gas flows through the bypass 45. In response to the signal from the detector 54, the unit 56 also energizes the coil 33 of the solenoid valve 32 so as to supply fuel to the burner 20. Other functions of the control unit 56 to actuate the motor 40 for driving the primary and secondary air pumps 41 and 42, and to supply the ignition plug 25 with an ignition voltage to cause it to ignite the air/fuel mixture in the burner 20.

Figure 4:
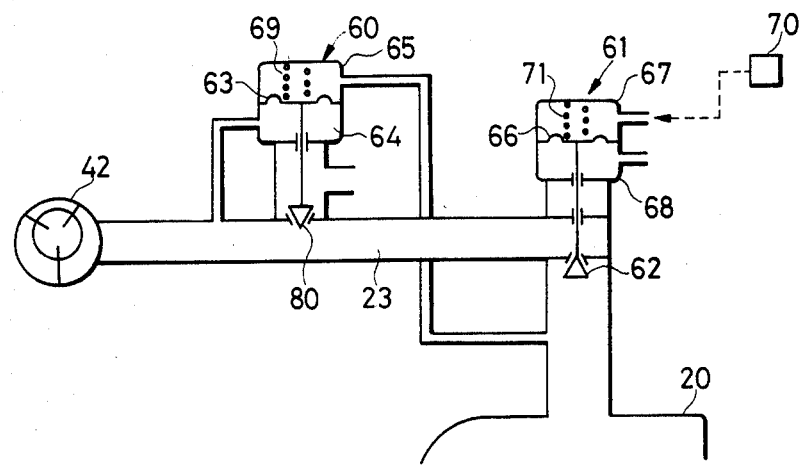
FIG. 4 is a schematic diagram illustrating a method of controlling the feed of secondary air to the system of FIG. 1.

Another embodiment of the present invention incorporating a device for stabilizing the combustion in the burner 20 is shown in FIG. 4. This stabilizing device is intended for correcting variations in atmospheric pressure such as those which may occur during driving at high altitudes or which arise due to variations in the characteristics of the air pumps. As shown in FIG. 4, the secondary air line 23 connecting the secondary air supply vane pump 42 and the burner 20 is provided with a pressure regulator 60 and a flow control unit 61. The pressure regulator 60 is divided into two chambers 64 and 65 by a diaphragm 63, and the respective chambers are supplied with air at different pressures, one chamber being connected to the line 23 at a point upstream of a flow control valve 62 and the other at a point downstream of the control valve 62. The flow control unit 61 is also divided into two chambers 67 and 68 by a diaphragm 66. Air at a pressure determined by a constant pressure valve is introduced into the chamber 67, whereas air at atmospheric pressure is supplied to the other chamber 68. Reference numerals 69 and 71 in FIG. 4 represent springs.

Figure 5:
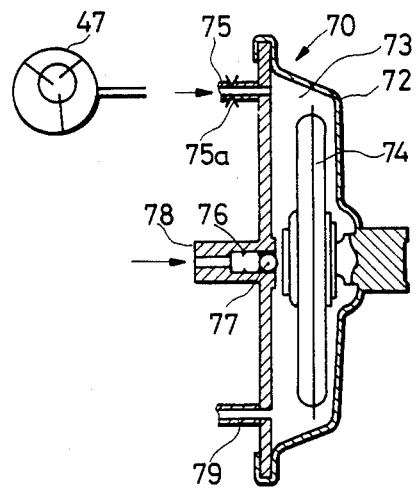
FIG. 5 is a longitudinal section showing a constant pressure valve used in the present invention.

A typical configuration of the constant pressure valve 70 is shown in FIG. 5. The valve has a constant pressure chamber 73 enclosed by a hermetic housing 72, a bellows 74 disposed within the chamber 73, a negative pressure pipe 75 having a throttle 75a and communicating the vacuum pump 47 with the constant pressure chamber 73, a pressure release pipe 78 having one end open to the atmosphere and which has incorporated therein a spring 76 and a spherical ball 7 as shown in FIG. 5, and a pipe 79 communicating with the chamber 67 in the flow control unit 61. When the pressure in the chamber 73 decreases, the bellows 74 inflates to press the spherical ball 77 in the pipe 78, whereupon air at atmospheric pressure enters the chamber 73 through the pipe 78. As a result, the pressure in the chamber 73 increases to compress the bellows 74, whereupon the ball 77 returns to the position where it closes the pipe 78. By repeating this procedure, the pressure in the chamber 73 can be held at a generally constant level.

When driving at high altitudes where low atmospheric pressure is prevalent, the density of the air can be so low that the burner 20 does not receive a sufficient air flow for combustion. It is therefore required to increase the degree of opening of the flow control valve 62 to introduce more air into the burner. The constant pressure valve 70 supplies an absolute constant pressure into the spring-loaded chamber 67 in the flow control unit 61. When the atmospheric pressure acting on the lower chamber 68 decreases, the spring 71 pushes down the valve 62 to increase the degree of its opening and to thereby provide an increased air flow. By this arrangement, an air flow rate sufficient for sustained combustion in the burner 20 is consistently supplied, notwithstanding variations in atmospheric pressure.

The change in the cross-sectional area of the line 23 due to the operation of the flow control valve 62 also causes a variation in the pressure at a point upstream of the valve 62. This pressure is sensitive to various factors such as the output of the vane pump 42 and the atmospheric pressure, and the pressure downstream of the flow control valve 62 is influenced by this upstream pressure even if the former has been adjusted to the proper value by the flow control unit 61. Accordingly, in the embodiment shown in FIG. 4, the pressure regulator 60 is provided at a point upstream of the flow control valve 62 in order to hold the differential pressure across the valve 62 constant, thereby supplying a constant air flow into the burner 20. If the pressure upstream of the valve 62 increases for for some reason, the pressure in the lower chamber 64 of the regulator 60 increases to push up the diaphragm 63, whereupon the valve 80 is lifted to provide a bypass for releasing part of the pressure increase to the atmosphere. This causes a drop in the pressure upstream of the control valve 62. The spring-loaded upper chamber 65 in the pressure regulator 60 receives the pressure downstream of the control valve 62, and the amount of the differential pressure across the valve 62 is limited by the selected force of the spring 69. Therefore, when the differential pressure across the control valve 62 drops below the predetermined level, the valve 80 is pushed down by the spring 69 to close the bypass. By this procedure, a constant and sufficient amount of air is supplied to the burner 20.

Figure 7:
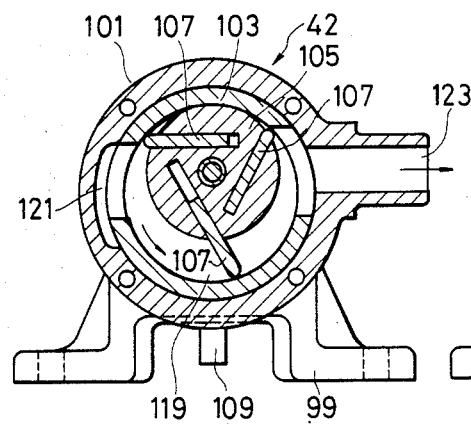
FIG. 7 is a cross section of FIG. 6 taken along a line VII—VII.
Figure 8:
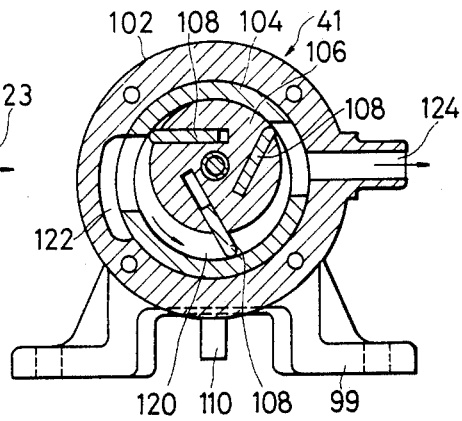
FIG. 8 is a cross section of FIG. 6 taken along a line VIII—VIII.

A specific feature of the present invention is the air pump system for use with the diesel particulate filter, and this is hereunder described by reference to FIG. 6. The air pump system is composed of vane pump units 41 and 42, both driven by the DC motor 40 having a construction the same as that used in the conventional air pump. The motor 40 has a stator 90, a rotor 91, a rotating shaft 92, bearings 93 and 94, a commutator 95, a brush holder 96, leads 97, a housing 98 and a mounting bracket 99. One end of the shaft 92 of the motor 40 is connected to the vane pump 41 which supplies the primary air flow, the vane pump 42 which supplies the secondary air flow, and an air filter 100. Cross sections of the vane pumps 42 and 41 are respectively shown in FIGS. 7 and 8. The vane pump 42 (41) includes a housing 101 (102), a liner 103 (104), a vane rotor 105 (106), vanes 107 (108), and a drain 109 (110). Each of the vane rotors 105 and 106 is fitted with a spline 92a, which is an extension of the rotary shaft 92 of the motor 40 so that each rotor is driven by rotation of the motor 40. The vane pumps 41 and 42 are isolated from other components by partitions 111, 112 and 113. The vane pump 41 has a smaller capacity than the vane pump 42. The air filter 100 is composed of a filter element 114, a cover 116 having perforations 115, and a screw 118 for mounting the cover 116 on the partition 111 with a pipe 114 interposed therebetween.

When the motor 40 starts to rotate, the vane rotor 105 (106) also rotates, and the vanes 107 (108) are projected outwardly by centrifugal force so that the tip of each vane slides against the inner periphery of the liner 103 (104). The vane rotor 105 (106) is eccentric with respect to the liner 103 (104) to form an open space 119 (120) which is divided into sections by the vanes 107 (108). Air introduced into the vane pump 42 (41) from the air filter 100 through an intake port 121 (122) is compressed by the vanes 107 (108) and discharged through an outlet 123 (124). Since the vane pump 42 has a larger capacity than the vane pump 41, the former discharges a greater air flow. On the other hand, the discharge port 124 of the vane pump 41 is more throttled at the discharge end than the discharge port 123 of the vane pump 42, and therefore the vane pump 41 discharges air at a higher pressure than that of the air discharged from the vane pump 42. As a result, the vane pump 41 discharges a smaller flow of primary air at a higher pressure, whereas the vane pump 42 discharges a larger flow of secondary air at a lower pressure. Therefore, the air pump system composed of the two vane pump units can be effectively used in combination with the DPF trapping system shown in FIG. 1.

Figure 6:
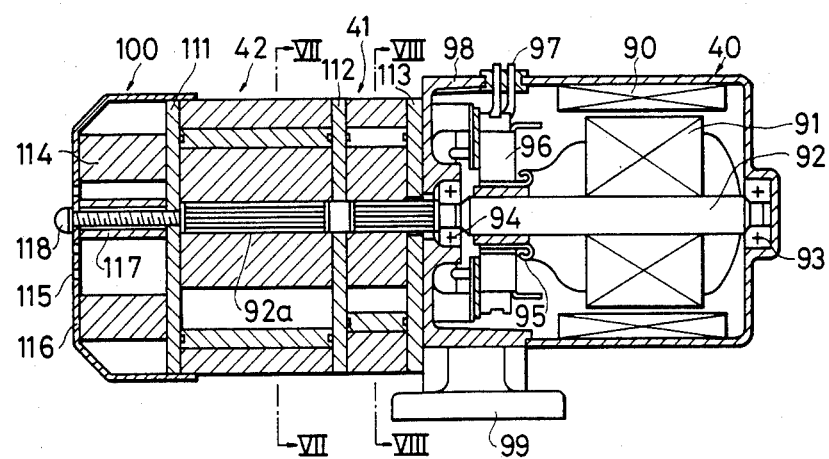
FIG. 6 is a longitudinal section showing a preferred embodiment of an air pump system of the present invention.

The pump system shown in FIG. 6 has both the primary air supply vane pump unit 41 and the secondary air supply vane pump 42 mounted on one side of the motor 40 so that only a single filter unit 100 need be used with the two pump units. This reduces the number of necessary parts and greatly enhances the ease of pump installation. As a further advantage, the pump system of FIG. 6 is small and lightweight and hence requires a smaller installation area.

Figure 9:
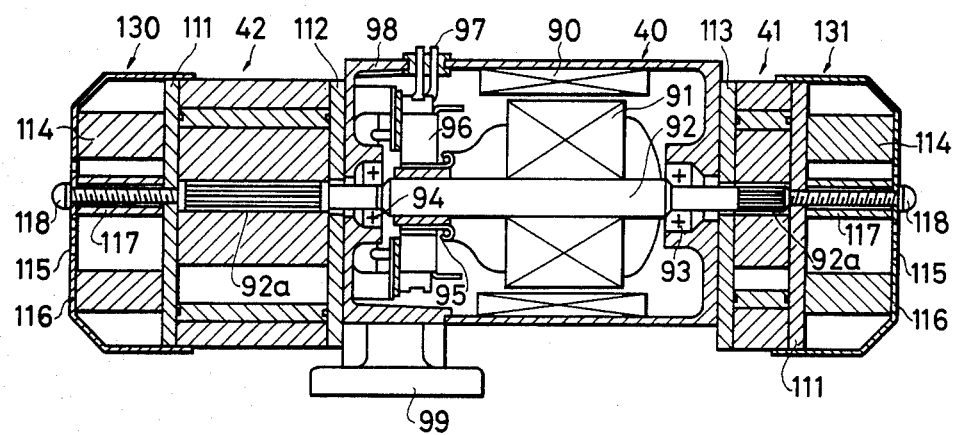
FIG. 9 is a longitudinal cross-sectional view showing another embodiment of an air pump system according to the present invention.

Another embodiment of the air pump system according to the present invention is shown in FIG. 9, wherein components which are substantially the same as those used in the air pump system of FIG. 6 are identified by the same reference numerals, and accordingly further detailed descriptions thereof will be omitted. In the embodiment of FIG. 9, the primary air supply vane pump 41 is positioned on one side of the motor 40 and the secondary air supply vane pump 42 on the other side of the motor. A filter 130 is connected to the vane pump 42 and a filter 131 connected to the vane pump 41. Due to the positioning of the two vane pumps on opposite sides of the motor 40, the vibration of the shaft 92 of the motor 40 due to the moment of eccentric rotation in the two vane pumps is reduced to such an extent that the motor can transmit a balanced driving force even at high operating speeds, with an incidental advantage of reduced noise. As a further advantage, the overall size and weight of the pump system is smaller than that of the conventional type wherein two separate motors are connected to the vane pump units.

As described in the foregoing, the air pump system of the present invention uses a single motor to drive two vane pump units having different flow rates and discharge characteristics. Because of the integration of loads, the air pump system of the present invention is more efficient and consumes less power than in the case of using two separate motors for the respective vane pump units. The use of a single motor has other advantages, namely, the combination of the primary and secondary air vane pump units provides a compact overall construction which can be incorporated into a vehicle easily and hence at low cost.

We claim:

1. A system for trapping diesel particles, comprising: an exhaust gas line extending from an exhaust port of a diesel engine; a particulate filter connected in said exhaust gas line; ignition means; a burner connected at a point upstream of said particulate filter and which is supplied with fuel, a primary air flow for atomizing said fuel and a secondary air flow for burning particulates trapped in said particulate filter and which supplies said particulate filter with a hot burning gas produced by said ignition means; primary and secondary air pumps for supplying said primary air and secondary air flows, respectively; a single motor for driving both said primary and secondary air pumps; and means for controlling said ignition means and said motor such that said filter; when it has trapped particulates in an amount exceeding a preset level, is cleaned by burning said particulates in said burner.

2. The system according to claim 1, wherein each of said primary and secondary air pumps comprises a positive displacement type air pump.

3. The system according to claim 1, wherein each of said primary and secondary air pumps comprises a movable vane type air pump.

4. The system according to claim 1, wherein said primary and secondary air pumps are sequentially mounted on a driving shaft extending from one end of said motor.

5. The system according to claim 1, wherein said primary and secondary air pumps are mounted on opposite ends of a driving shaft extending from opposite sides of said motor.

6. The system according to claim 1, further comprising: a secondary air line connecting said secondary air pump and said burner; a flow control valve provided in said secondary air line for controlling a cross-sectional area of said secondary air line according to variations in atmospheric pressure; a valve open to the atmosphere provided in said secondary air line at a point upstream of said flow control valve; and a pressure regulator for detecting a difference between a pressure in said secondary air line at a point upstream of said flow control valve and a pressure at a point downstream of said flow control valve and controlling said valve open to the atmosphere in such a manner that said pressure difference is held substantially constant.

7. A system for trapping diesel particulates, comprising: an exhaust gas line extending from an exhaust port of a diesel engine; a particulate filter connected in said exhaust gas line; an exhaust gas bypass line bypassing said particulate filter and in said exhaust line; a valve switch disposed at a junction between said exhaust line and said exhaust gas bypass line; ignition means; a burner connected at a point upstream of said particulate filter and which is supplied with a fuel, primary air flow for atomizing said fuel and a secondary air flow for burning particulates trapped in said particulate filter and which feeds said particulate filter with a hot burning gas ignited by said ignition means; primary and secondary air pumps for supplying said primary and secondary air flows; a single motor for driving said primary and secondary air pump; a fuel supply pumps; a fuel nozzle for supplying fuel to said burner; a solenoid valve disposed in a line connecting said fuel supply pump and said fuel nozzle; means for detecting an amount of particulates trapped in said filter; and control means for, in response to a signal from said detection means, driving said valve switch to open said bypass line and simultaneously driving said motor and said solenoid valve.

8. The system according to claim 7, further comprising: a secondary air line connecting said secondary air pump and said burner; a flow control valve provided in said secondary air line for controlling a cross-sectional area of said secondary air line according to variations in atmospheric pressure; a valve open to the atmosphere provided in said secondary air line at a point upstream of said flow control valve; and pressure regulator means for detecting a difference between a pressure in said secondary air line at a point upstream of said flow control valve and a pressure at a point downstream of said flow control valve and controlling said valve open to the atmosphere in such a manner that said pressure difference is held substantially constant.

9. The system according to claim 8, wherein each of said primary and secondary air pumps comprises a movable vane type air pump, and said two pumps are sequentially mounted on a driving shaft extending from one end of said motor.

10. The system according to claim 8, wherein each of said primary and secondary air pumps comprises a movable vane type air pump, and said two pumps are mounted on opposite ends of a driving shaft extending from opposite sides of said motor.

* * * * *